(12) United States Patent
Oki

(10) Patent No.: US 6,813,369 B2
(45) Date of Patent: Nov. 2, 2004

(54) IMAGE PROCESSING APPARATUS, IMAGE PROCESSING METHOD AND A COMPUTER PROGRAM PRODUCT

(75) Inventor: Mitsuo Oki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 532 days.

(21) Appl. No.: 09/774,124

(22) Filed: Jan. 31, 2001

(65) Prior Publication Data

US 2001/0026629 A1 Oct. 4, 2001

(30) Foreign Application Priority Data

Jan. 31, 2000 (JP) ........................................ 2000-021564

(51) Int. Cl.$^7$ ................................................ G06K 9/00
(52) U.S. Cl. ...................... 382/100; 382/233; 358/1.14; 708/203
(58) Field of Search ................................ 382/100, 112, 382/116, 137, 167, 176, 140, 232, 233, 234, 237, 243, 247, 218, 242; 345/555; 348/397.1, 398.1; 358/426.04, 426.13, 426.16, 1.14; 708/203; 705/54

(56) References Cited

U.S. PATENT DOCUMENTS 5,717,776 A * 2/1998 Watanabe .................... 382/116
5,760,797 A * 6/1998 Koizumi et al. ............... 347/14
5,850,481 A * 12/1998 Rhoads ........................ 382/232
5,854,853 A * 12/1998 Wang .......................... 382/176
6,314,409 B2 * 11/2001 Schneck et al. ............... 705/54
6,603,864 B1 * 8/2003 Matsunoshita .............. 382/100

* cited by examiner

Primary Examiner—Bhavesh M. Mehta
Assistant Examiner—Seyed Azarian
(74) Attorney, Agent, or Firm—Fitzpatrick, Cella, Harper & Scinto

(57) ABSTRACT

An image processing apparatus which includes input device for inputting an image to printed, determining device for determining whether the input image includes predetermined information, output device for outputting a printed image of the input image using either a first type of processing or a second type of processing, wherein if the determining device determines the input image includes the predetermined information, the output device uses the first type of processing which outputs an irregular image of the input image and if the determining device determines the input image does not include the predetermined information, the output device uses the second type of processing which outputs an image of the input image.

35 Claims, 3 Drawing Sheets

IMAGE PROCESSING APPARATUS, IMAGE PROCESSING METHOD AND A COMPUTER PROGRAM PRODUCT

BACKGROUND OF THE INVENTION

1. Field of the Invention

The present invention relates to an image processing apparatus, an image processing method and a computer program product for determining whether certain attached (added) information such as a copyright notice exists in an image to be printed.

2. Description of the Related Art

Currently, conventional image processing machines, such as a copier, do not judge whether a printed image has (or has attached) copyrighted information or not, and based on that judgment, alter printing of an image to be printed. Further, when an image processing machine judges whether many printed images has copyrighted information, it is necessary to judge each image to be printed/copied. However, to determine if each image contains copyrighted information in it the processing would take a long time for the judging process for each image. As such the entire printing process would be slow.

As printers, as typified by an ink-jet printer, become lower in price, it would be difficult to justify cost of employing expensive hardware in an ink-jet printer to judge whether a copyright notice exists. However, if the printer does not include expensive hardware and inexpensive software to judge copyright, it would require a longer time to perform a copyright judging process and printing.

SUMMARY OF THE INVENTION

An object of the present invention is to provide solutions for the above problems.

One particular object of the present invention is to provide an image processing apparatus and method and a computer program product that can store information which is attached (added) to a printed image and indicates either a copyright notice or a banknote together with information which checks an image to be printed and if the copyright notice or banknote information exists, an irregularity process is performed for the image to be printed.

Another object of the present invention is to provide an image processing apparatus and method and a computer program product which does not judge whether attached (added) information exists in an image to be printed each time the image is to be printed so that high speed processing can be performed.

Still another object of the present invention is to provide an image processing apparatus and method and a computer program product that have a new function not known before.

The foregoing and still other objects, features and advantages of the present invention will become fully apparent from the following description to be taken in conjunction with the attached drawings.

DESCRIPTION OF THE PREFERRED EMBODIMENTS

Figure 1:
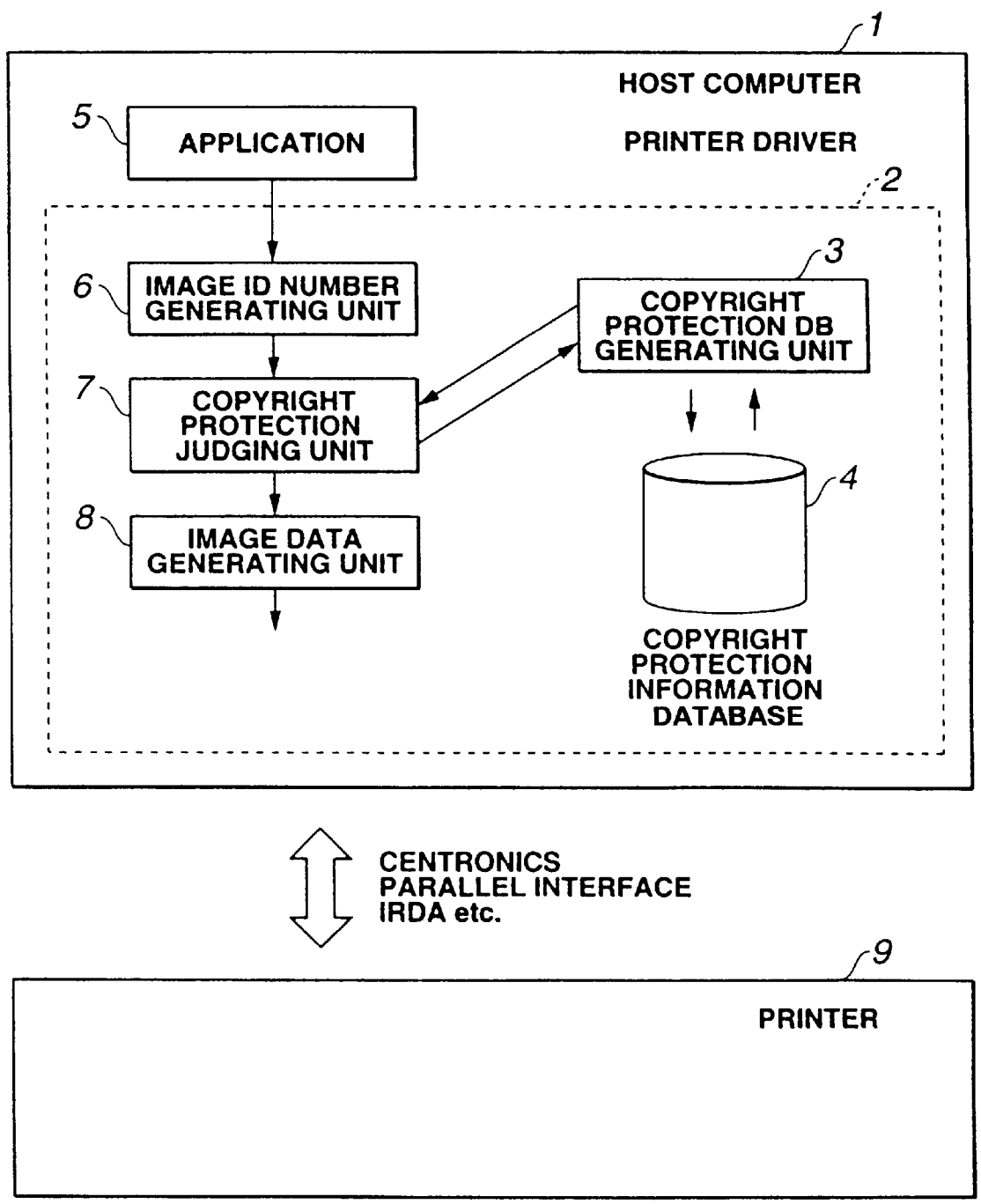
FIG. 1 is a block diagram which shows the printing apparatus of one embodiment of the present invention.

The following is a detailed explanation, which is made with reference to the drawings of the preferred embodiments of this invention.

One embodiment of the present invention will be described by making reference to a printing apparatus. Briefly, the printing apparatus comprises several units; Image ID number generating unit which converts image information as print commands received from an application to bytes of data and generates a unique image ID number for the image (the conversion is an irregularity process which calculates the amount of the image information by using, for example check-sum method, message digest score method, or other irregularity processing);

Copyright protection judging unit which extracts copyright information which is attached(added) to the image as digital water mark etc. and judges whether the image has a copyright or not. Copyright protection database generating unit stores a set of ID number information generated by the image ID number generating unit and the judging result of the copyright protection judging unit as copyright protect information data base in storage medium.

Using the above units, the printing apparatus judges whether an image, received from application as print commands, has copyright information or not by the copyright protection judging unit. ,h,† the image has (is attached to or is added to) copyright information, the printing apparatus stops the printing process or informs the printing apparatus's user that the image has a copyright notice and changes the printing image (changes color, alters filter process etc.).

Generally, copyright information is a digital water mark which is invisible information added in a specific frequency of the image information or is visible but difficult to see for human eyes.

The copyright information can be of any type of digital water mark and may be a bar code or a predetermined pattern.

The following is a more detailed description of present invention with reference and the drawing figures.

The Structure of this System

FIG. 1 is a block diagram which shows the overall system of one embodiment of the present invention.

This system (copyright protection printing machine) is comprised of host computer 1 and printer 9.

The host computer 1 is connected to printer 9 by Centronics parallel interface, USB (universal serial bus) interface, wireless interface and so on. Host computer 1 includes copyright protection judging unit 7 which is part of printer driver 2 and performs its functions by software processes in this embodiment.

Printer driver 2 is comprised of image ID number generating unit 6, copyright protection judging unit 7, copyright protect database generating unit 3, copyright protecting information database 4 and image data generating unit 8.

Figure 2:
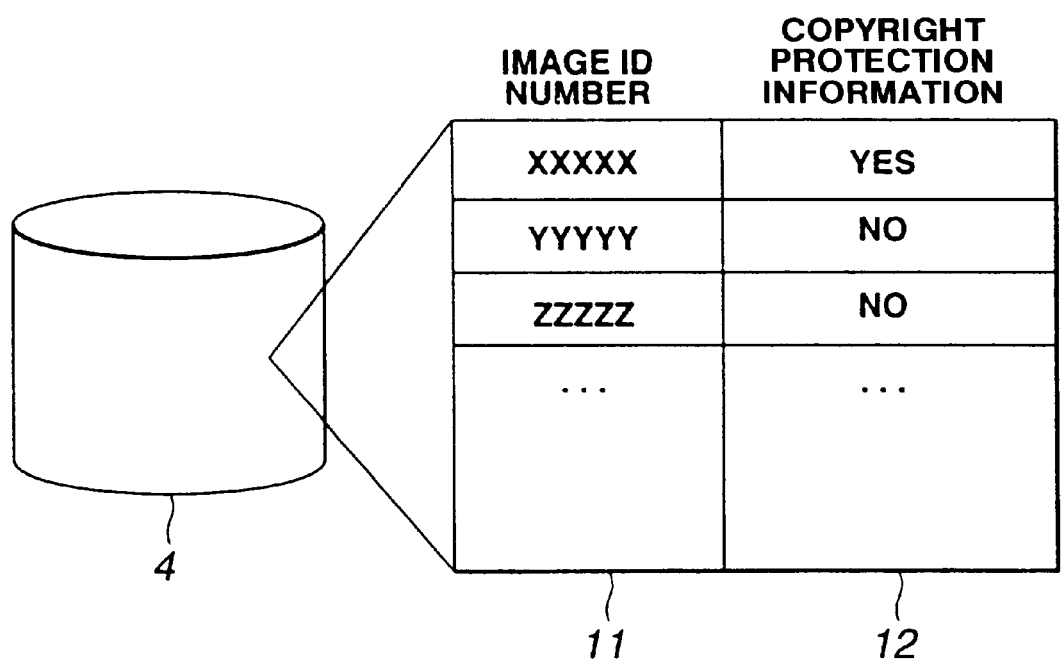
FIG. 2 is the detail of copyright protecting database of one embodiment of the present invention.

FIG. 2 is a detailed description of copyright protecting database 4 of one embodiment of the present invention.

Copyright protection database 4 stores a pair of image ID number 11 and copyright protecting information 12. These elements of printer driver 2 are stored in a hard disk as a computer program. It is possible to store the elements in a detachable memory device, for example a floppy disc, and a compact disc and so on.

When application 5 issues a print command to printer driver 2, image ID number generating unit 6 generates a unique image ID number by performing an irregularity process which converts image information as a print command received from application into a length of data. The irregularity process is frequently used to calculate the sum of data of the image in accordance with a method and the result of the irregularity process i.e. check sum, message digest score etc.

A sufficient number of bytes is used for the image ID number, so that the incidence of the same image ID number for different images being used can be decreased, however the number of bytes for image ID number is overwhelmingly less than the amount of data of the image.

Next, copyright protection judging unit 7 judges whether image information in the print command has already checked the image for attached copyright information in accordance with the result of comparing the image ID number is generated from image ID generating unit 6 with the image ID was stored together with the copyright information in copyright protection database generating unit 4.

Copyright protection judging unit 7 can judge the image by using the image ID which uses less time than judging the entire image information for copyright information. A copyright judging time of the copyright judging process is much shorter than one of judging process which judges copyright information for each pixel of the printing image by checking the image ID number.

Copyright protection judging unit 7 stops the print process or informs the user of the system that the image to be printed has copyright information by displaying information on the monitor of host computer 1. In addition, copyright protection judging unit 7 changes the printing process of the image (changes color, filtering process etc.) if the printing image has copyright information.

As a result the printing system is more efficient and provides better performance when judging if the image to be provided has copyright information.

Figure 3:
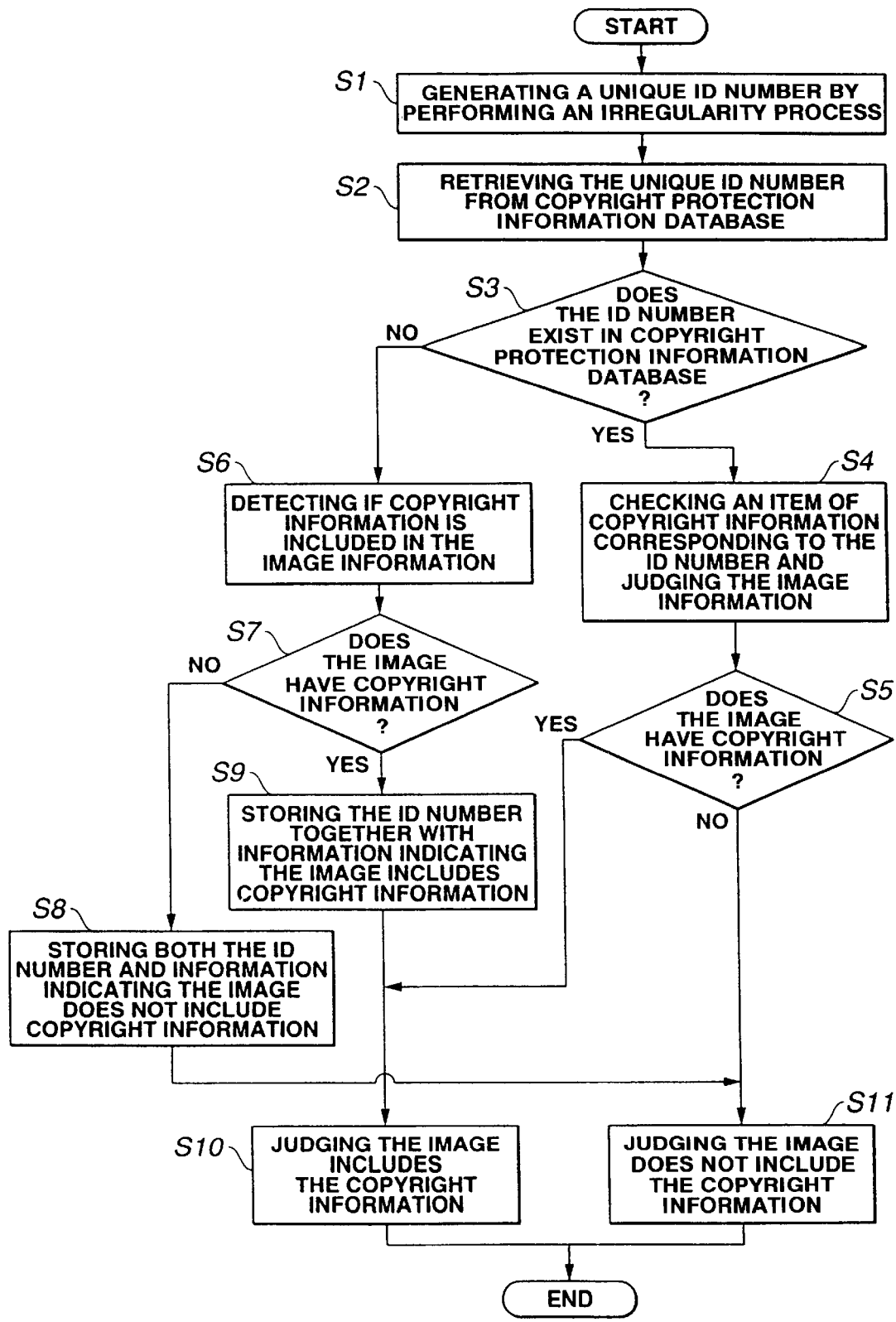
FIG. 3 is a flow chart that shows the operation of the present embodiment.

Next, an operation of judging copyright information of an image based on the flow chart on FIG. 3 is explained.

FIG. 3 is the flowchart describing the procedure for judging whether the image to be printed includes copyright information or not.

The process described in FIG. 3 is performed by copyright protection judging unit 7.

In step 1, copyright protection judging unit 7 generates a unique image ID number by performing an irregularity process which converts image information to reduce as a print command from application 5. In step 2, copyright protection judging unit 7 retrieves the unique ID number from copyright protection information database 4. In step 3, if there exists identical ID numbers in copyright protection information database 4 in accordance with the result of the retrieve, the process flows to step 4. In step 4, copyright protection judging unit 7 checks an item of copyright information corresponding to the identical ID number and judges whether the image information has copyright information or not.

In step 5, the process of this flow chart changes the route in response to the result of step 4. In the case the image information has copyright information, the process proceeds to step 10. On the other hand in the case the image information does not have copyright information, the next process begins at step 11.

In step 3, when no generated image ID number exists in the copyright protection information database 4 as the result of step 2, the process flows to step 6.

In step 6, copyright protection judging unit 7 judges whether the image information, as a print command received from the application 5, has copyright information by detecting if copyright information is included (added) in the image information as a digital water mark, etc.

In step 7, the process of this flow chart proceeds in response to the result of step 6. In the case the copyright information is attached (added) to the image information as a digital water mark, the next process is step 9.

In step 9, copyright protection judging unit 7 controls copyright protection database generating unit 3 to store the image ID number generated in step 1 together with an information indicating that the judged image includes the copyright information in copyright protection information database 4.

In step 10, copyright protection judging unit 7 determines that the image information, as a print command received from the application 5, has copyright information.

On the other hand in the case the image information does not include copyright information in step 7, flow proceeds to the next process in step 8.

In step 8, copyright protection judging unit 7 requests copyright protection DB generating unit 3 to store both the image ID number generated in step 1 and an information indicating the judged image does not include copyright information to the copyright information on copyright protection information database 4.

Copyright protection judging unit 7 determines that the image information, as a print command received from the application 5, does not have copyright information in step 11.

Next, are some examples of copying copyrighted images in a this printing system based on the sequence of FIG. 3.

There are two images. One of them (image A) has(is attached to or is added to) the copyright information and the other (image B) does not have (is attached to or is added to) copyright information.

A print process which the printing system, in FIG. 3, prints each of image A and, a twice is initiated.

EXAMPLE 1

In a case of printing image A (first time); copyright protection judging unit 7 judges whether the image information of the image A has a copyright notice by detecting copyright information which is attached to or is added to the image information as a digital water mark, etc., because there does not exist a copyright information for the image A on copyright protection information data base 4.

As a result of the judging copyright protection judging unit 7 judges that image A has copyright information. Copyright protection judging unit 7 controls copyright protection data base generating unit 3 to store the image ID number corresponding to image A together with the copyright information indicating image A has copyright information on copyright protection database 4 at the same time.

EXAMPLE 2

In a case of printing image A (second time), copyright protection judging unit 7 judges whether the image information of the image A includes a copyright notice by checking the copyright information which is stored together with the image ID number corresponding to image A. As a result of checking, copyright protection judging unit 7 determines that image A has the copyright information.

Copyright protection judging unit 7 does not judge whether the image information of image A has copyright Information by detecting a digital water mark, etc., when the system prints image A a second time. As a result, for any subsequent print requests judging of the copyright information can be faster than the first time.

EXAMPLE 3

In a case of printing image B (first time), copyright protection judging unit 7 judges whether the image information of the image B has a copyright notice by detecting if copyright information is attached (added) to the image information as a digital water mark, etc., because there does not exist copyright information for image B stored in copyright protection information data base 4. As a result of the judging, copyright protection judging unit 7 determines the image B does not have copyright information.

Copyright protection judging unit 7 controls copyright protection data base generating unit 3 to store image ID number corresponding to image B together with the copyright information indicating the image B does not have copyright information in copyright protection data base 4 at the same time.

EXAMPLE 4

In a case of printing image B (second time); copyright protection judging unit 7 judges whether the image information of the image B has a copyright notice by checking the copyright information which is stored together with the image ID number corresponding to image B. As a result of checking, copyright protection judging unit 7 determines the image B does not have the copyright information and image B is printed.

Copyright protection judging unit 7 does not judge whether the image information of the image B has copyright Information by detecting a digital water mark, etc., when the system prints the image B at second time. As a result, subsequent print requests can be faster than the first time.

Copyright protection judging unit 7 can judge, in the example 2 and 4, whether an image has copyright information without detecting whether copyright information is attached (added) to the image as a digital water mark etc., therefore the judgment in example 2 and 4 is faster than the one in the example 1 and 3, when printing the image a first time by using the printing system.

Next will be described a second embodiment which posses the following four features.

(1) A printing system which can judge whether a printing image has copyright information.
(2) A printing system which can stop printing in accordance with the judging result whether an image to be printed has copyright information or notify the user of the printing system that an image to be printed has copyright information and changes the printing image (changes color, makes filter process etc.).
(3) For a first time a request to print an image to be printed, a printing system judges, by detecting whether a digital watermark exists, whether the image includes copyright information or not. Once a determination is made the image is printed and information related to whether copyright information exists or not is stored as an image ID number corresponding to the image. Thereafter, during subsequent printing operations of the same image, the printing system does not have to perform detecting of the copyright information but rather checks the stored image ID number. As a result, the printing system produces better performance than one detecting digital watermark for every printing time.
(4) The printing system which, can judge whether an image to be printed has ever been printed previously by the printing system.

The printing system of the second embodiment may judge whether information (such as digital water mark or specific pattern) is attached (or added) to a bill or valuable securities and to control a database to store the result of the judging together with a unique image ID.

As a result, the printing system can judge whether a bill or valuable securities has a copyright notice or registration attached so as to prohibit counterfeiting by using the database illustrated in FIG. 3.

The printing system, according to the second embodiment, stops printing when image information of an image having copyright information is to be printed. It is possible to contain in an image information relating to the number of prints that may be made of the image as the digital watermark in an image. In this case, copyright protection judging unit 7 judges information relating to the number of permitted prints when an image is inputted the printing system in FIG. 1. If it is the first time to input the image to the printing system, copyright protection judging unit 7 requests copyright protection DB generation unit 3 to store an image ID number of the image together with information relating to the number of permitted prints. The image ID number is generated by the irregularity process. The printing system controls printing the image in accordance with information of number of permitted prints.

When an image is input to this printing system, copyright protection judging unit 7 judges whether the image is the image corresponding to the stored image ID number by comparing the stored image ID number with an ID number corresponding to the input image. If the input image is the image corresponding to the stored image ID, copyright protection judging unit 7 requests copyright protection DB generation unit 3 reduce number of prints permitted from the database. And if the number of the permitted prints is zero after the printing system finishes printing the image for the permitted times, copyright protection judging unit 7 requests copyright protection DB generation unit 3 to change 'information of permitting print times' to 'information of stopping printing' on copyright protecting information database 4.

In another case, it is possible for an image to certain information relating to the number of print permitted as well as a reasonable cost for each print (royalty) and information of the copyright owner as the digital watermark in an image. In this case, copyright protection judging unit 7 judges information relating to the number of print permitted as well as a reasonable cost for each print (royalty) and information of the copyright owner (ex. IP or network address, telephone number) when an image is inputted the printing system in FIG. 1. If it is the first time to input the image to the printing system, copyright protection judging unit 7 requests copyright protection DB generation unit 3 to store the image ID number together with information relating to the number of print permitted as well as a reasonable cost for each print (royalty) and information of the copyright owner on copyright protecting information database 4. The image ID number is generated by the irregularity process. The printing system controls printing the image in accordance with information relating to the number of print permitted as well as a reasonable cost for each print (royalty) and information of the copyright owner.

When an image is inputted to this printing system, copyright protection judging unit 7 judges whether the image is the image correspond to the stored image ID number by comparing the stored image ID number with an ID number correspond to the input image. If the input image is the image correspond to the stored image ID, copyright protection judging unit 7 requests the copyright protection DB generation unit 3 to retrieve the information of the copyright owner form copyright protecting information database 4 in accordance with the image ID number of the input image.

The system user is permitted printing the input image when the system user communicates the copyright owner of the copyright by network and pays a reasonable cost.

As described above, according to the present invention, when the application issues a print command to printer driver, image ID number generating unit generates an unique image ID number by performing an irregularity process which converts image information, as a print command received from application, into some length of data. It is frequently used as the irregularity process to calculate the sum of data of the image in accordance with a method and the result of the irregularity process calls "check sum", "message digest score".

Next, copyright protection judging unit judges whether the image information, as the print command, includes copyright information in accordance with comparing the image ID number generated from image ID generating unit together with the image ID stored with copyright information in copyright protection data base generating unit when the image processed printing previously. The printing system is possible to keep high performance and judges if the printing image has (is attached to or is added to) copyright information consequently.

The printing system can stop printing in accordance with the judging result whether the printing image has (is attached to or is added to) copyright information or notifies the user of the printing system that the printing image has copyright information and changes the printing image (changes color, makes filter process etc.).

The printing system can judge that the image, which is going to print, have ever printed by the printing system by comparing the image ID number stored on the copyright protection information database with the image ID number generated from the printing image now.

The object of the present invention can be also achieved by providing a storage medium storing program codes for performing the aforesaid processes to a system or an apparatus, reading the program codes with a computer (e.g., CPU, MPU) of the system or apparatus from the storage medium, then executing the program. In this case, the program codes read from the storage medium realize the functions according to the embodiments, and the storage medium storing the program codes constitutes the invention. Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (Operating System) or the like working on the computer performs a part or entire processes in accordance with designations of the program codes and realizes functions according to the above embodiments.

The printing system can store an information which attach(add) to an printing image and indicate a copyright or a bill or valuable securities together with an information which discriminate the printing image and is generated by performing an irregularity process to the printing image, and so the printing system can store an information that the printing image has already checked the attached(added) information. The printing system don't judge the printing image by detecting an digital water mark which have judged once by using the stored information and can get high speed process.

What is claimed is:

1. An image processing apparatus comprising:
   judging means for judging whether an image includes specific information attached to or added to the image;
   generating means for generating information corresponding to the image by performing an irregularity process on image data for the image, wherein the irregularity process converts the image data into a length of data; and
   storing means for storing (i) information indicating whether the image includes the specific information, together with (ii) the generated information.

2. An image processing apparatus according to claim 1, wherein the specific information is attached or added to the image as a digital water mark which is visible or invisible.

3. An image processing apparatus according to claim 1, wherein the specific information is information about copyright of the image or information indicating the image is one of valuable securities.

4. An image processing apparatus according to claim 1, further comprising;
   checking means for checking whether an image to be printed includes the specific information in accordance with comparing the result of performing the irregularity process for the image to be printed with the stored information; and
   controlling means for controlling printing of the image to be printed in response to the checking result.

5. An image processing apparatus according to claim 4, wherein said controlling means stops printing and informs a user that the image to be printed includes the specific information, without said judging means performing judging for the image to be printed, if the checking result indicates that the image to be printed has already been judged to include a specific image.

6. An image processing apparatus according to claim 5, wherein said controlling means informs a user about information of a rightful claimant.

7. An image processing apparatus according to claim 4, wherein said judging means performs judging and said storing means performs storing for the image to be printed if the checking result indicates that said judging means has already performed judging for the image to be printed.

8. An image processing apparatus according to claim 7, wherein said controlling means stops printing and informs a user that the image to be printed includes the specific information if the image to be printed is judged to include the specific image.

9. An image processing apparatus according to claim 4, wherein said judging by said judging means performs a software process by using a program.

10. An image processing apparatus according to claim 4, wherein said irregularity process converts said image to a predetermined length code.

11. An image processing method comprising:
    a judging step for judging whether an image includes specific information attached to or added to the image;
    a generating step for generating information corresponding to the image by performing an irregularity process on image data for the image, wherein the irregularity process converts the image data into a length of data; and
    a storing step for storing (i) information indicating whether the image includes the specific information, together with (ii) the generated information.

12. An image processing method according to claim 11, wherein the specific information is attached or added to the image as a digital water mark which is visible or invisible.

13. An image processing method according to claim 11, wherein the specific information is information about copyright of the image or information indicating the image is one of valuable securities.

14. An image processing method according to claim 11, further comprising:
a checking step for checking whether an image to be printed includes the specific information in accordance with comparing the result of performing the irregularity process for the image to be printed with the stored information; and
a controlling step for controlling printing of the image to be printed in response to the checking result.

15. An image processing method according to claim 14, wherein said controlling step stops printing and informs a user that the image to be printed includes the specific information, without performing said judging step for the image to be printed, if the image to be printed has already been judged to include the specific information on the basis of the checking result.

16. An image processing method according to claim 15, wherein said controlling step informs a user about information of a rightful claimant.

17. An image processing method according to claim 14, wherein said judging step and said storing step are performed for the image to be printed if the checking result indicates that the judging step has not already been performed for the image to be printed.

18. An image processing method according to claim 14, wherein said controlling step stops printing and informs a user that the image to be printed specific information if the image to be printed is judged to include the specific information.

19. An image processing method according to claim 14, wherein said judging by said judging step performs a software process by using a program.

20. An image processing method according to claim 14, wherein said irregularity process converts said image to a predetermined length code.

21. A computer program product, comprising a computer readable medium having computer program codes, for executing image processing, said product including:
judging process procedure codes for judging whether an image includes specific information attached to or added to the image;
generating process procedure codes for generating information corresponding to the image by performing an irregularity process on image data for the image, wherein the irregularity process converts the image data into a length of data; and
storing process procedure codes for storing (i) information indicating whether the image includes the specific information, together with (ii) the generated information.

22. An image processing apparatus comprising:
input means for inputting an image to printed;
determining means for determining whether the input image includes predetermined information;
generating means for generating information corresponding to the image to be printed by performing an irregularity process on image data, wherein the irregularity process converts the image data into a length of data; and
output means for outputting a printed image of the input image using either a first type of processing or a second type of processing;
wherein if the determining means determines the input image includes the predetermined information, the output means uses the first type of processing which outputs an irregular image of the input image and if the determining means determines the input image does not include the predetermined information, the output means uses the second type of processing which outputs an image of the input image.

23. An image processing apparatus according to claim 22 further comprising;
storage means for storing the predetermined information.

24. An image processing apparatus according to claim 22, wherein the predetermined information is copyright information.

25. An image processing apparatus according to claim 23, wherein the storage means stores information related to an image and copyright information.

26. An image processing apparatus according to claim 22, wherein the predetermined information is included in the image as a digital water mark.

27. An image processing apparatus according to claim 22, wherein the determining means determines the input image includes the predetermined information by detecting a digital water mark when the input image is inputted the first time.

28. An image processing apparatus according to claim 25, wherein in case the determining means determines the input image includes the predetermined information, the storage means stores ID information related to the input image and copyright information for subsequent processing.

29. An image processing apparatus according to claim 28, wherein the determining means determines the input image includes the predetermined infomation by checking said ID information when the input image is input a second time.

30. An image processing apparatus according to claim 23, wherein the storage means stores information related to an image and copyright owner infomation for a subsequent processing.

31. An image processing apparatus according to claim 23, wherein the storage means stores information relating to the number of prints that may be made of the image or information relating to the number of prints permitted as well as reasonable cost for each print and information of the copyright owner for a subsequent processing.

32. An image processing apparatus according to claim 10, wherein said irregularity process converts said image data to one of a checksum and a message digest score.

33. An image processing method according to claim 20, wherein said irregularity process converts said image data to one of a checksum and a message digest score.

34. A computer program product according to claim 21, wherein the irregularity process converts said image data to one of a checksum and a message digest score.

35. An image processing apparatus according to claim 22, wherein said irregularity process converts said image data to one of a checksum and a message digest score.

* * * * *

UNITED STATES PATENT AND TRADEMARK OFFICE
CERTIFICATE OF CORRECTION

PATENT NO.     : 6,813,369 B2
DATED          : November 2, 2004
INVENTOR(S)    : Mitsuo Oki It is certified that error appears in the above-identified patent and that said Letters Patent is hereby corrected as shown below:

Title page,
Item [57], ABSTRACT,
Line 2, "to" should read -- to be --.
Line 7, "the" (first occurrence) should read -- that the --.

Column 1,
Line 20, "has" should read -- have --.

Column 2,
Line 28, ",h,†" should be deleted.

Column 4,
Line 66, "Information" should read -- information --.

Column 5,
Line 31, "Information" should read -- information --.

Column 7,
Line 2, "form" should read -- from --.
Lines 57, 59 and 62, "an" should be deleted.
Line 58, "attach(add)" should read -- attaches (adds) --; "an" should read -- a --; and "indicate" should read -- indicates --.
Line 60, "discriminate" should read -- discriminates --.
Line 61, "and" should be deleted.
Line 64, "don't" should read -- doesn't --.
Line 65, "an" should read -- a -- and "have" should read -- has --.

Column 9,
Line 31, "printed specific" should read -- printed is specific --.

UNITED STATES PATENT AND TRADEMARK OFFICE
CERTIFICATE OF CORRECTION

PATENT NO. : 6,813,369 B2
DATED : November 2, 2004
INVENTOR(S) : Mitsuo Oki

It is certified that error appears in the above-identified patent and that said Letters Patent is hereby corrected as shown below:

Column 10,
Line 12, "claim 22" should read -- claim 22, --.
Lines 25, 30 and 35, "the" (second occurrence) should read -- that the --.

Signed and Sealed this

Third Day of May, 2005

JON W. DUDAS
*Director of the United States Patent and Trademark Office*